United States Patent [19]
Jagiella et al.

[11] Patent Number: 5,489,888
[45] Date of Patent: Feb. 6, 1996

[54] SENSOR SYSTEM FOR CONTACTLESS DISTANCE MEASURING

[75] Inventors: Manfred Jagiella, Karlsruhe; Kilian Barth, Forbach, both of Germany

[73] Assignee: precitec GmbH, Gaggenau-Bad Rotenfels, Germany

[21] Appl. No.: 288,534

[22] Filed: Aug. 10, 1994

Related U.S. Application Data

[63] Continuation-in-part of Ser. No. 53,034, Apr. 23, 1993, abandoned, which is a continuation-in-part of Ser. No. 788,865, Nov. 7, 1991, abandoned.

[30] Foreign Application Priority Data

Nov. 7, 1990 [DE] Germany .......................... 40 35 403.2

[51] Int. Cl.⁶ .................................................. G08B 1/08
[52] U.S. Cl. ........................ 340/537; 340/572; 324/662; 324/611
[58] Field of Search ..................... 340/537, 572, 340/562; 324/662, 611

[56] References Cited

U.S. PATENT DOCUMENTS

| | | | |
|---|---|---|---|
| 4,295,132 | 10/1981 | Burney | 340/562 |
| 4,401,949 | 8/1983 | Gold | 340/537 |
| 4,467,273 | 8/1984 | Rudolph | 340/537 |
| 4,575,714 | 3/1986 | Rummel | 340/568 |

*Primary Examiner*—Kenneth A. Wieder
*Assistant Examiner*—Jose M. Solis
*Attorney, Agent, or Firm*—Anderson Kill Olick & Oshinsky

[57] ABSTRACT

A sensor system is disclosed for the contactless measuring of the distance between a sensor body and an object. The sensor body contains an identification resistor, the resistance value of which can be interrogated by a control unit which is connected to the sensor body and which is located outside the sensor body. The interrogation makes it possible to determine whether the electrical connection between the control unit and the sensor body exists or is interrupted. If it is interrupted, this can be detected by the control unit in an unambiguous manner due to the missing connection to the identification resistor, and the control unit can generate an alarm signal in order to avoid faulty positioning of the sensor body relative to the object.

12 Claims, 3 Drawing Sheets

1

SENSOR SYSTEM FOR CONTACTLESS DISTANCE MEASURING

This is a continuation-in-part application of U.S. patent application Ser. No. 08/053,034, filed Apr. 23, 1993 now abandoned which is a continuation-in-part application of U.S. patent application Ser. No. 07/788,865, filed Nov. 7, 1991 now abandoned.

FIELD OF THE INVENTION

The present invention relates to a sensor system for contactless distance measuring.

BACKGROUND OF THE INVENTION

Such a sensor system is already part of the prior art and contains a sensor body, a sensor element, arranged at the sensor body for contactlessly measuring the distance between itself and an object, a control unit, for supplying a measuring voltage to the sensor element and for evaluating the measuring voltage for the purpose of determining the distance, and a cable, between the sensor body and the control unit, which is used for transmitting the measuring voltage.

The sensor system is capable of measuring the distance between the sensor element and the object, for example, by capacitive or inductive means, if it is a metallic object, or by optical or acoustical means depending on the system configuration.

If the sensor body of the sensor system is permanently joined to a tool, it is possible to position the tool relative to the object or workpiece in order to be able to machine the workpiece in a suitable manner. Positioning occurs via a control device which receives the measured distance as an actual value and controls the position of the sensor body or the tool by comparing the actual value with a predetermined set tip.

The tool can be, for example, a laser cutting unit for generating a laser beam by means of which the workpiece can be cut or otherwise treated.

At the beginning of the development of sensor systems of this type, not only the sensor element but also a large proportion of the sensor electronics were located inside the sensor body. If, therefore, the sensor body was separated from the control unit by detaching the cable, the control unit was able to detect this unambiguously. In such a case, it generated a warning signal, by means of which the control device for positioning the sensor body was deactivated or stopped.

Integrating the sensor electronics in the sensor body, however, entailed a number of disadvantages. Thus, there was only little space inside the sensor body for installing the electronic components. Installing and calibrating these electronic components was therefore very time-consuming and thus represented a considerable cost factor. Due to the space required for installing the electronic components, the design of the nozzle body was much more elaborate, which also entailed additional costs. Furthermore, integrating the electronic components in the sensor body constituted an obstacle to making the sensor body as slender as possible, which is required, in particular, when the workpiece or object is to be machined three-dimensionally under restricted spatial conditions. There is also the risk of a temperature drift of the actual value or measurement value supplied by the sensor body due to the sensor electronics heating up too much inside the sensor body which is subject to very great heating when it operates in conjunction with a laser cutting tool and is positioned in the immediate vicinity of the cutting track.

Due to the above disadvantages, the decision was made to arrange the complete sensor electronics at a very great distance from the sensor body. More accurately, the sensor electronics were connected to the sensor body by means of a cable several meters in length, which could also be shielded. The shielding could also be carried out actively, which means that the measurement signal present at the sensor element is applied to the shielding via a capacitor and an amplifier having a gain of V which is equal to 1.

If the sensor electronics are now separated from the sensor body by detaching the cable, however, this leads to a misinterpretation of the actual value by the control unit. In such a case, the control unit detects a very large actual value or distance which is much greater than the normal operating distance, so that it attempts to reduce this distance again. This involves the considerable risk that the sensor element and the sensor body run against the object or workpiece, which could lead to damage.

If, for example, this is a capacitively operating sensor system, the separation of the cable from the sensor body leads to the control unit detecting only a severely reduced measuring capacitance, since the signal line of the cable is now free. However, this effect also rises when the distance between the sensor body of the sensor element and the object or workpiece is much greater than the normal working distance. For this reason, it is not possible to generate an unambiguous warning signal from the measurement signal.

SUMMARY OF THE INVENTION

Accordingly, the present invention is based on the object of developing a sensor system of the last-mentioned type, in which the complete sensor electronics are located outside the sensor body, in such a manner that the control unit can unambiguously detect whether it is separated from the sensor body or not.

Pursuant to this object, and others which will become apparent hereafter, one aspect of the present invention resides in the sensor system having an identification resistor attached to the sensor body. The identification resistor is connected to the cable, and the control unit is constructed so that it supplies an interrogation voltage, which does not influence the measuring voltage, via the cable to the identification resistor for interrogating the resistance value of the identification resistor.

It is possible to determine whether or not the identification resistor, which has a known value, and thus the sensor body, is connected to the control unit by monitoring the magnitude of the interrogation current belonging to the interrogation voltage. Thus, an alarm signal can be generated in a simple manner when, for example, the sensor body and the control unit are separated from one another and no interrogation current flows, in order to avoid a mispositioning of the sensor body or sensor element relative to the object or workpiece.

The control unit can also generate the alarm signal when an interrogated resistance value of the identification resistor does not correspond to a predetermined resistance value or deviates from the latter by a predetermined or threshold value. The interrogated resistance value is calculated from interrogation voltage and interrogation current, and a microprocessor can be used for this purpose. The comparison between the interrogated resistance value and the predetermined resistance value or predetermined threshold is effected by correspondingly existing comparators or by software measures with the aid of a microcomputer.

If an identification resistor with a different resistance value is allocated to each type of sensor body, a sensor identification can be carried out on the basis of the absolute value of the interrogation current. For this purpose, there is a comparator for comparing an interrogated resistance value (current) of the identification resistor with one or more predetermined resistance values (currents). Thus, the interrogated resistance value (current) is compared with the predetermined resistance values (currents) until an appropriate resistance value (current) is found among the predetermined resistance values (currents).

According to a further embodiment of the invention, the control device is constructed in such a manner that it interrogates the resistance value or current of the identification resistor before measuring the distance, or continuously or intermittently during such a measurement. This ensures that no mispositionings between the sensor body or workpiece and object occur during the entire measuring cycle if the cable connection between the sensor body and the control unit should become detached for whatever reason.

According to yet another embodiment of the invention, an alternating voltage is used as the measuring voltage and a direct voltage as the interrogation voltage. Alternating measuring voltages occur, for example, in capacitive and inductive sensor systems, whereas a direct voltage is advantageous as the interrogation voltage, since it can be easily measured for detecting the state of the connection between control unit and sensor body.

According to still another embodiment of the invention, the direct voltage and the alternating measuring voltage are transmitted via the same center conductor of a coaxial cable, the identification resistor being connected between the center conductor and the shielding of the coaxial cable. Thus, only a single cable with two conductors is needed for transmitting the measuring voltage and the interrogation voltage, which cable would also have to be used when transmitting the measuring voltage alone. Thus, no additional wires or possibly other cables are needed to transmitting the interrogation voltage.

This embodiment can be used, for example, in capacitive or inductive sensor systems. In this arrangement, the identification resistor has no influence on the distance measurement value. For example, the measuring capacitance in a capacitive sensor system would be between the center conductor or the core of the coaxial cable and earth (workpiece), whereas the identification resistor is located between the center conductor and the shield of the coaxial cable. Where active shielding is used, the same potential is present at the shield conductor and center conductor so that no current flows through the identification resistor if a correct connection exists between control unit and the sensor body. The direct voltage or interrogation voltage has no influence on the distance measurement value either, since it is only generated from the alternating measuring voltage, for example by using filters and the like. In an inductive sensor system, the identification resistor is connected in series with the sensor element or with the coil arrangement.

In accordance with another embodiment of the invention, the cable between the control unit and the sensor body is a triaxial cable, the alternating measuring voltage being transmitted via the cable core and the identification resistor being connected between the two shields of the triaxial cable.

According to a very advantageous further embodiment of the invention, the identification resistor is arranged in a socket which is attached to the sensor body and to which the cable can be connected via a plug. This type of integration of the identification resistor clearly facilitates the assembly of the sensor body, since the identification resistor can already be connected to the connector socket before it is inserted into the sensor body. Since the connector socket is permanently connected to the sensor body, the identification resistor is thus also attached to the sensor body. Where an inductive sensor system is used, the identification resistor can be arranged in the connector socket in such a manner that it is located electrically in series between two center conductor ends of the connector socket. The insulator then also accommodates the identification resistor.

A micro-metal film resistor (micromelf resistor) is preferably used as the identification resistor, which has particularly small dimensions and can therefore be integrated in the connector socket in a very simple manner.

As already mentioned, the sensor system can operate capacitively, so that the sensor element is a capacitive element and virtually represents one electrode of a capacitor, the other electrode of which is formed by the object or workpiece.

However, the sensor system can also operate inductively, so that the sensor element is an inductive element. For example, an induction coil or a group of induction coils can be used as the inductive element, the inductance of which is changed as a function of the distance from the object or workpiece.

The respective measurement signals contain information on the change in capacitance or inductance so that the control unit can determine the distance of the sensor body or of the sensor element from the object or workpiece on the basis of this information.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
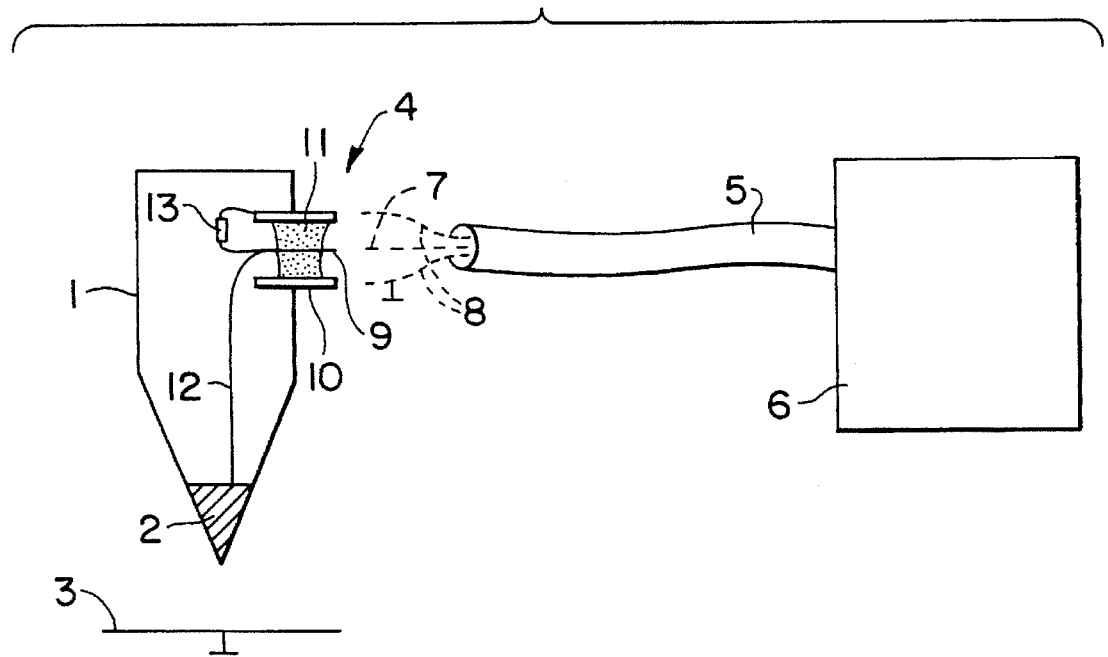
FIG. 1 shows a basic circuit diagram of a capacitively operating sensor system pursuant to the present invention with a coaxial cable between sensor body and control unit.

The sensor system shown in FIG. 1, which operates capacitively, contains a sensor body 1, at the tip of which a sensor element 2 is arranged. The sensor element 2 consists of electrically conductive material, for example of copper, and is electrically insulated from the sensor body 1. A workpiece has the reference symbol 3 and is connected to earth potential. The sensor element 2 and the workpiece 3 thus form a capacitor, the capacitance of which is a measure of the distance between the two elements 2 and 3.

A coaxial connector socket 4 is located in a side wall of the sensor body 1 and is electrically insulated from the latter. A coaxial plug, not shown, which is connected to one end of a coaxial cable 5, the other end of which is connected to a control unit 6, can be connected from the outside to the coaxial connector socket 4. The center conductor (core) of the coaxial cable 5 carries the reference symbol 7, while the shielding of the coaxial cable 5 carries the reference symbol 8. The shielding 8 is connected, for example, to earth potential.

The coaxial connector socket 4 exhibits a center conductor 9, with respect to which an outer ring conductor 10 is coaxially arranged. Between the center conductor 9 and the outer ring conductor 10 an insulating material 11 is located. The outer ring conductor 10 is electrically in contact with the sensor body 1.

At the output end, the center conductor 9 can be connected via the coaxial plug, not shown, to the core 7 and the outer ring conductor 10 can be connected to the shield 8 of the coaxial cable 5.

On the other hand, the center conductor 9 is electrically connected to the sensor element 2 via a shielded line 12 in the interior of the sensor body 1. The center conductor 9 is electrically connected to the outer ring conductor 10 of the coaxial connector socket 4 via an identification resistor 13, also in the interior of the sensor body 1. The identification resistor 13 exhibits a known or defined resistance value which changes only very slightly in the temperature range in question of the sensor body 1 and thus is to be considered virtually constant.

To measure the distance between the sensor element 2 and the workpiece 3, an alternating measurement signal, which is evaluated in a conventional manner, is transmitted from the control unit 6 via the center conductor 7 of the coaxial cable 5, the center conductor 9 and the shielded line 12 to the sensor element 2. For example, if it has a fixed frequency, its amplitude can be used for distance determination.

In addition, the control unit applies a direct voltage as an interrogation voltage to the identification resistor 13 via the center conductor 7 of the coaxial cable 5 and the center conductor 9 in order to determine, by measuring the resistance value of this identification resistor 13, whether the control unit 6 is connected to the sensor body 1 via the coaxial cable 5.

As already mentioned initially, the direct voltage and the alternating measurement signal do not mutually influence one another, since the measuring capacitance is located between the center conductor 7 or the center conductor 9 and earth or the workpiece 3, whereas the identification resistor is located between the center conductor 7 or the center conductor 9 and the shield 8 or the outer ring conductor 10. Since the distance measurement value is only generated from the alternating measuring voltage which can be filtered appropriately, it is not influenced by the direct voltage or interrogation voltage present on the center conductor 7.

If the control unit 6 is electrically separated from the sensor body 1 because, for example, the coaxial plug, not shown, has been detached from the coaxial connector socket 4, no direct current flows via the center conductor 7 to the shield 8 because of the direct or interrogation voltage applied to the center conductor 7. The control unit 6 detects this condition by measuring the direct current and generates an alarm signal which deactivates or stops the control device for positioning the sensor body 1 relative to the workpiece 3. The sensor body 1 can thus not be mistakenly driven against the workpiece 3.

If, in contrast, the control unit 6 and the sensor body 1 are electrically connected to one another via the coaxial cable 5, a direct current flows from the center conductor 7 to the shield 8, in accordance with the resistance value of the identification resistor 13 due to the interrogation voltage applied to the center conductor 7, so that the control unit 6 does not generate a warning signal in this case and, in addition, can recognize the type of sensor body 1 by means of the measured direct current value. Depending on the sensor body type, an identification resistor 13 having a different resistance value can be used. For example, a suitable control program for positioning the sensor body 1 relative to the workpiece 3 can then be selected independently of the type of sensor body 1.

With reference to FIG. 1, the sensor body 1 is connected with the control unit 6 via a coaxial cable 5 which, however, can also be a shielded cable. Both the sensor element 2 and the characteristic resistor 13 are connected with the center conductor 7. The characteristic resistor 13 is located between the center conductor 7 and the shield conductor 8 of the cable 5.

It is important to the invention that both the measurement voltage for the capacitive distance measurement and the interrogating voltage for the characteristic resistor 13 are transmitted via the same center conductor 7. The measurement voltage is an alternating voltage, while the interrogating voltage is a d.c. voltage which is superimposed on the alternating voltage.

Another very important feature in FIG. 1 consists in that the shield conductor 8 of the cable 5 is connected to an active shield potential. The active shield potential is obtained in that the measurement voltage, connected to the center conductor 7, is guided to the shield conductor 8 via an amplifier having an amplification factor of V which is greater than or equal to 1. Thus, the alternating measurement voltage has the same phase at the center conductor 7 and at the shield conductor 8 so that no a.c. current passes through the interrogating resistor 13. Rather, only the capacitive distance measurement is carried out with the aid of the alternating voltage, wherein the alternating voltage reaches the sensor element 2 via the conductor 12.

It should be pointed out that no alternating current passes through the interrogating resistor 13 due to the active shielding. Rather, the interrogating resistor 13 is supplied with a d.c. voltage so that an interrogating current d.c. voltage passes through the resistor 13. The interrogating current d.c. current, however, does not pass through the sensor element 2 since the sensor element 2 is separated from the workpiece 3.

Therefore, the substantial characteristic features of the present invention consist of the features that the characteristic resistor 13 and the sensor electrode 2 are connected with the same center conductor 7; an alternating measurement voltage as well as an interrogating d.c. voltage are transmitted via the center conductor 7; and an active shield potential is connected to the shield conductor 8 of the cable 5.

The identification resistor 13, is preferably a micro-metal film resistor which is very small and can therefore be integrated directly in the interior of the connector socket.

Figure 2:
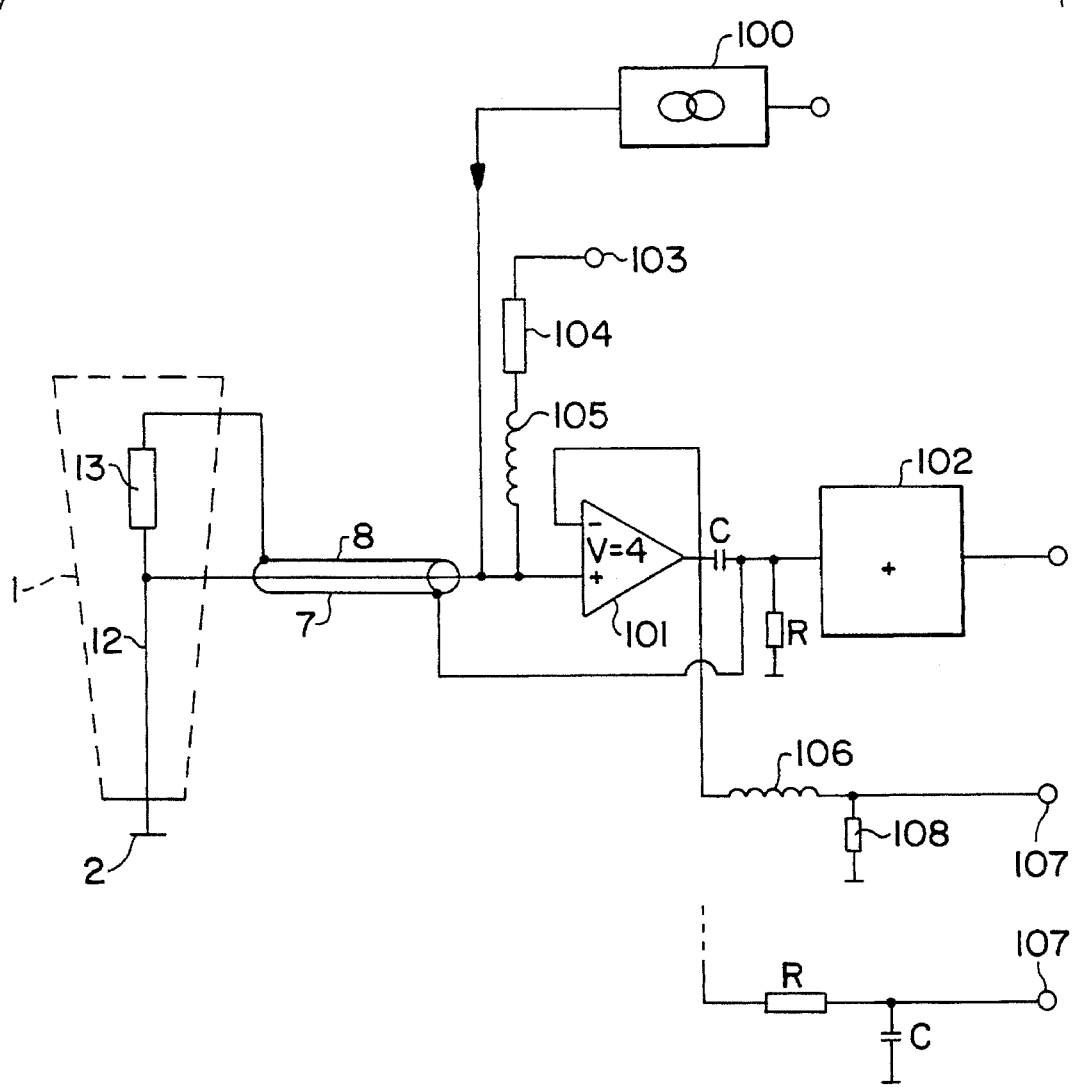
FIG. 2 shows a circuit which corresponds to the circuit diagram of FIG. 1 with which an interrogating d.c. voltage and a measurement alternating voltage can be transmitted via one and the same conductor.

FIG. 2 illustrates another circuit with which the interrogating d.c. voltage and the measurement alternating voltage can be transmitted via one and the same conductor. The circuit corresponds to that shown in FIG. 1. An a.c. source 100 whose output is connected with the conductor 7 serves to generate the alternating measurement voltage. The alternating measurement voltage accordingly reaches the sensor element 2 via conductor 7 and conductor 12. It is altered by the capacitance $C_{measurement}$ so that a measurement signal is located at the (+) input of the amplifier 101. The output of the amplifier 101 is guided to a rectifier 102 with a low-pass filter via a decoupling capacitor (filter capacitor) C. The distance signal $U_{distance}$ can be taken off at the output of the latter.

The amplifier 101 has an amplification factor V which is greater than or equal to 1 and the output of the amplifier 101 is likewise guided to the shield conductor 8 via the decoupling capacitor C to supply the shield conductor 8 with active shield potential in this way. It is also important to note that it is possible for the amplification factor V of the amplifier 101 to be less than 1. An amplification factor of slightly less than 1, such as, for example, 0.95 is also envisioned and is possible with the circuitry of the present invention.

The interrogating d.c. voltage for the characteristic resistance 13 is generated by means of a d.c. voltage source 103 and given to the center conductor 7 via a resistor 104 and a coil 105. The coil 105 serves to block alternating currents and is connected in series with the resistor 104. The coil may be omitted in case of a high stability of the d.c. voltage generated by the d.c. voltage source 103. In other words, the interrogating d.c. current from the d.c. current source 103 passes through the elements 104 and 105 to the center conductor 7 and through the characteristic resistor 13 and the shield conductor 8 back to a line between the decoupling capacitor C and the input of the rectifier 102. A coil 106 connected to the output of the amplifier 101 serves to block alternating currents. The other end of the coil 106 is connected with an output 107 at which the characteristic voltage $V_{characteristic}$ can be taken off, specifically via a resistor 108. An RC low-pass filter can be used instead of the elements 106, 108.

Thus, the characteristic features of the invention are also realized in this case, the alternating voltage from the a.c. source 100 and the d.c. voltage from the d.c. source 103 being supplied to the same conductor, namely the center conductor 7 of the shielded cable. Its shielding 8 receives active sensor potential, specifically from the output of the amplifier 101 via the decoupling capacitor C, so that both conductors 7 and 8 are connected to the same alternating potential. Accordingly, no alternating current can pass through the resistor 13. Only the interrogating current d.c. which produced a corresponding voltage drop at the resistor 108 passes through this resistor 13. The voltage at the output 107 can then be compared in a known manner with other voltage values in order thereby to determine the magnitude of the resistance 13 when the magnitude of the interrogating current of the current source 103 is known.

Figure 3:
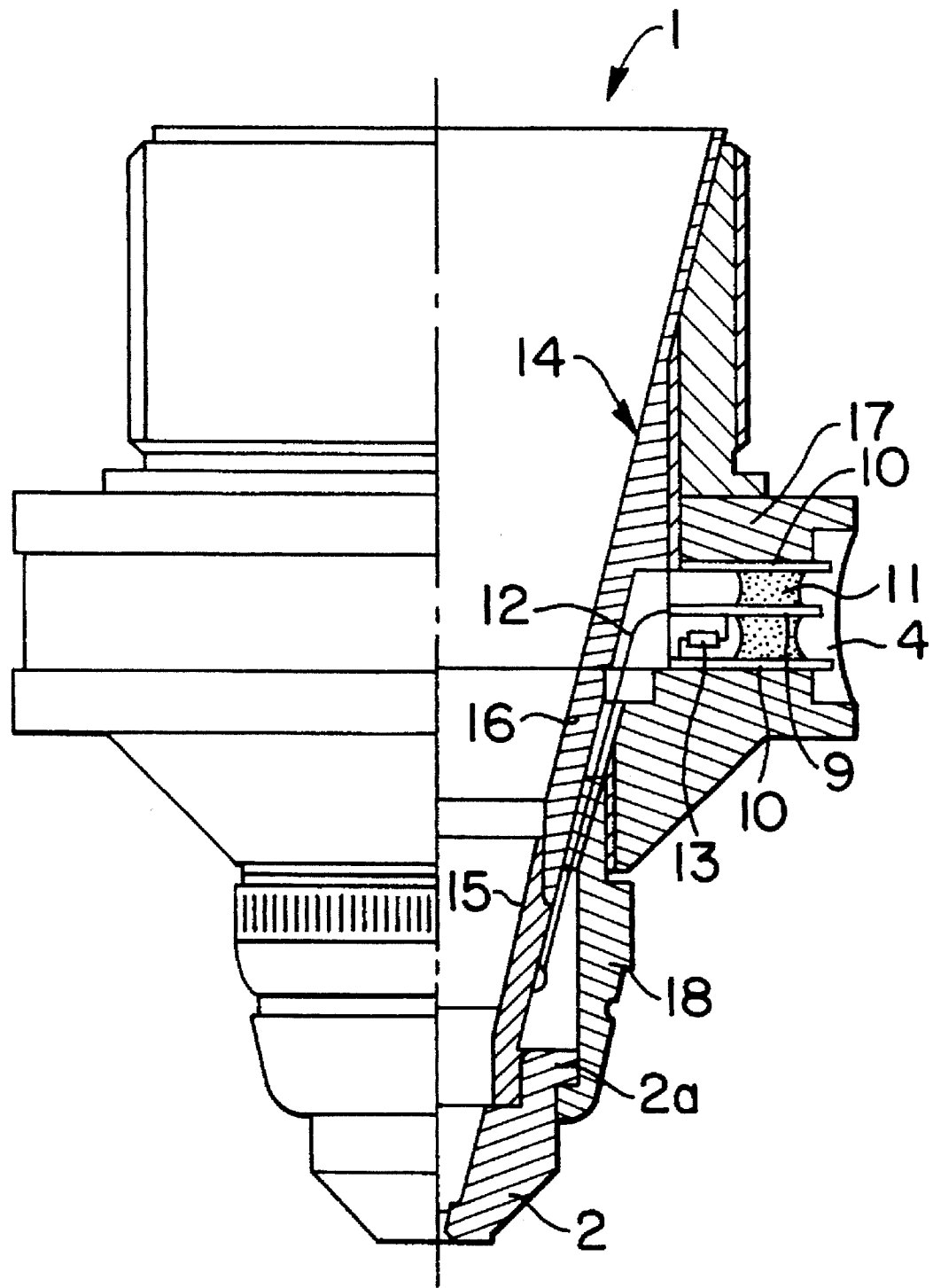
FIG. 3 shows a sensor body for capacitive distance measuring, shown partially as an axial section.

FIG. 3 shows such a case by means of the example of a capacitive sensor body.

The sensor body 1 contains a sensor element 2 which consists of electrically conductive material and has a nozzle 14 at the tip. The nozzle 14 contains a front area 15 of electrically conductive material which is in electrical contact with the sensor element 2. However, the front area 15 is electrically insulated from the remaining area 16 of the nozzle 14, for example, by a suitable ceramic adhesive by means of which the parts 15 and 16 are permanently joined to one another. The area 16 also consists of electrically conductive material and has a shielding function. An electrically conductive sleeve 17 concentrically surrounds the nozzle and is connected to it. A cap nut 18 of electrically conductive material, which encircles a flange 2a of the sensor element 2 and can be screwed into the sleeve 17 is used for holding the sensor element 2 on the tip of the front area 15. The cap nut 18 is electrically insulated in the area where it is connected to the sensor element 2 or the outer flange 2a, so that the sensor element 2 and the cap nut 18 do not have any electrical contact with one another. In contrast, the cap nut 18 is electrically connected to the sleeve 17 and, via the latter, electrically connected to the area 16 of the nozzle 14.

In the side area of the sleeve 17, the coaxial connector socket 4 is screwed in, to which the coaxial cable 5 of FIG. 1 can be connected via the coaxial plug, not shown. The outer ring conductor 10 of the coaxial connector socket 4 is in electrical contact with the sleeve 17 and is at shield potential. The shield potential is either earth potential or, in the case of active shielding, the measuring potential. The center conductor 9 of the coaxial connector socket 4 is electrically insulated from the outer ring conductor 10 by means of an insulator 11, the center conductor 9 being electrically connected to the front area 15 of the nozzle 14 via a shielded line 12 in the interior of the sensor body 1. The alternating measurement signal supplied by the control unit 6 thus passes via the center conductor 9 and the shielded line 12 to the front area 15 and from there to the sensor element 2. The elements 16, 17 and 18 are also used as shielding elements.

As can be seen in FIG. 3, an identification resistor 13 is located in the interior of the hollow-cylindrically constructed outer ring conductor 10 and is thus protected against damage. One terminal of the identification resistor 13 is connected to the center conductor 9, while the other terminal of the identification resistor 13 is connected to the outer ring conductor 10. The identification resistor 13 can be integrated in the coaxial connector socket 4 even before the latter is screwed into the sleeve 17. If, in contrast, the insulator 11 completely fills the remaining hollow space inside the outer ring conductor 10, the identification resistor 13 can come to be located, instead of in the interior of the outer ring conductor 10, also at its front end and on the insulator 11. In other respects, the mode of operation of the identification resistor 13 in FIG. 3 corresponds to the mode of operation of the identification resistor 13 in FIG. 1.

While the invention has been illustrated and described as embodied in a sensor system for contactless distance measuring, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention. What is claimed as new and desired to be protected by Letters Patent is set forth in the appended claims.

What is claimed is:

1. A sensor system, for capacitive distance measurement, comprising:

a sensor body;

a sensor element arranged at said sensor body for contactlessly measuring a distance between said sensor element and an object;

a control means for supplying a measuring voltage to said sensor element and for evaluating said measuring voltage for the purpose of determining said distance;

a cable between said sensor body and said control means which is used for transmitting said measuring voltage; and an identification resistor having a resistance value and being attached to said sensor body and connected to said cable, said control means being constructed so that it supplies an interrogation voltage, which does not influence said measuring voltage, via said cable to said identification resistor for interrogating said resistance value of said identification resistor, wherein said measuring voltage is an alternating voltage and said interrogation voltage is a direct voltage, and further wherein said cable is a coaxial cable having a center conductor and a shield conductor, and wherein the direct voltage and the alternating measuring voltage are transmitted via said center conductor of said coaxial cable and said identification resistor is connected between said center conductor and said shield conductor of said coaxial cable, and wherein said shield conductor is connected to an active shield potential obtained in that the measuring voltage is guided to said shield conductor via an amplifier.

2. The sensor system of claim 1, wherein said control means includes a comparator for comparing an interrogated resistance value of said identification resistor with at least one predetermined resistance value.

3. The sensor system of claim 2, wherein said control means generates an alarm signal when said interrogated resistance value does not correspond to at least one of a predetermined resistance value and is above a predetermined threshold.

4. The sensor system of claim 1, wherein said control means interrogates said resistance value of said identification resistor before measuring said distance.

5. The sensor system of claim 1, wherein said control means interrogates said resistance value of said identification resistor continuously during the measurement.

6. The sensor system of claim 1, wherein said control means interrogates said resistance value of said identification resistor intermittently during the measurement.

7. The sensor system of claim 1, wherein said identification resistor is arranged in a connector socket which is attached to said sensor body and to which said cable is connectable by a plug.

8. The sensor system of claim 1, wherein said identification resistor is a micro-metal film resistor.

9. The sensor system of claim 1, wherein said sensor element is a capacitive element.

10. The sensor system of claim 1, wherein said connector socket has a center conductor, and wherein said identification resistor is located between two ends of said connector socket center conductor.

11. The sensor system of claim 1, wherein said amplifier has an amplification factor which is greater than or equal to 1.0.

12. The sensor system of claim 1, wherein said amplifier has an amplification factor which is less than 1.0.

* * * * *